(12) United States Patent
Yanagisawa (10) Patent No.: US 11,353,786 B2
(45) Date of Patent: Jun. 7, 2022

(54) POLARIZING BEAM SPLITTER AND PROJECTOR

(71) Applicant: SONY CORPORATION, Tokyo (JP)

(72) Inventor: Hiroyuki Yanagisawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,757

(22) PCT Filed: Aug. 23, 2019

(86) PCT No.: PCT/JP2019/033042
§ 371 (c)(1),
(2) Date: Mar. 1, 2021

(87) PCT Pub. No.: WO2020/054362
PCT Pub. Date: Mar. 19, 2020

(65) Prior Publication Data
US 2021/0318606 A1    Oct. 14, 2021

(30) Foreign Application Priority Data

Sep. 11, 2018  (JP) .............................. JP2018-169932

(51) Int. Cl.
*G03B 33/12* (2006.01)
*G02B 27/28* (2006.01)

(52) U.S. Cl.
CPC .......... *G03B 33/12* (2013.01); *G02B 27/283* (2013.01)

(58) Field of Classification Search
CPC .............................. G03B 33/12; G02B 27/283
USPC ......................................................... 353/20
See application file for complete search history.

(56) References Cited

U.S. PATENT DOCUMENTS

| 5,283,600 A * | 2/1994 | Imai | G02B 27/283 |
|---|---|---|---|
| | | | 348/E9.027 |
| 2004/0184006 A1 | 9/2004 | Okuyama et al. | |
| 2006/0044514 A1* | 3/2006 | Ushigome | H04N 9/3167 |
| | | | 353/20 |

(Continued)

FOREIGN PATENT DOCUMENTS

| CN | 1172956 A | 2/1998 |
|---|---|---|
| CN | 1519615 A | 8/2004 |

(Continued)

OTHER PUBLICATIONS

International Search Report and Written Opinion of PCT Application No. PCT/JP2019/033042, dated Oct. 21, 2019, 11 pages of ISRWO.

(Continued)

*Primary Examiner* — Jerry L Brooks
(74) *Attorney, Agent, or Firm* — Chip Law Group (57) ABSTRACT

A polarizing beam splitter according to the present disclosure includes a transparent optical member, at least one first polarizing beam splitting film, and at least one second polarizing beam splitting film. The at least one first polarizing beam splitting film is disposed inside the transparent optical member to be tilted at a first tilt angle with respect to a first axis. The first axis is parallel to entering light. The at least one second polarizing beam splitting film is disposed inside the transparent optical member to be tilted at a second tilt angle with respect to the first axis. The second tilt angle is in a direction opposite to that of the first tilt angle.

7 Claims, 10 Drawing Sheets

(56) References Cited

U.S. PATENT DOCUMENTS

2015/0103319 A1    4/2015  Miyabara et al.
2015/0355535 A1  12/2015  Endo et al.

FOREIGN PATENT DOCUMENTS

| CN | 1908753 | A | 2/2007 |
|---|---|---|---|
| CN | 101059578 | A | 10/2007 |
| CN | 101398600 | A | 4/2009 |
| CN | 104570374 | A | 4/2015 |
| CN | 105278020 | A | 1/2016 |
| EP | 1443356 | A2 | 8/2004 |
| EP | 2955552 | A2 | 12/2015 |
| JP | 2000-035552 | A | 2/2000 |
| JP | 2000-35552 | A | 2/2000 |
| JP | 2001-290216 | A | 10/2001 |
| JP | 2004-233910 | A | 8/2004 |
| JP | 2005-037745 | A | 2/2005 |
| JP | 2013-242466 | A | 12/2013 |
| JP | 2015-79079 | A | 4/2015 |
| JP | 2015-232611 | A | 12/2015 |

OTHER PUBLICATIONS

Office Action for CN Patent Application No. 201980057709.6, dated Dec. 27, 2021, 04 pages of English Translation and 09 pages of Office Action.

\* cited by examiner

POLARIZING BEAM SPLITTER AND PROJECTOR

CROSS REFERENCE TO RELATED APPLICATIONS

This application is a U.S. National Phase of International Patent Application No. PCT/JP2019/033042 filed on Aug. 23, 2019, which claims priority benefit of Japanese Patent Application No. JP 2018-169932 filed in the Japan Patent Office on Sep. 11, 2018. Each of the above-referenced applications is hereby incorporated herein by reference in its entirety.

TECHNICAL FIELD

The present disclosure relates to a polarizing beam splitter and a projector.

BACKGROUND ART

For example, in a projector optical system, a glass-block-shaped MacNeille PBS (Polarizing Beam Splitter) is used as a polarizer (see PTL 1). The MacNeille PBS is a polarizing beam splitter utilizing a Brewster's angle. A polarizing beam splitting film generally requires an angle of about 45° with respect to an optical axis of entering light. A typical MacNeille PBS has a cubic shape as a whole, and has an effective size and a thickness in a relationship of approximately 1:1.

CITATION LIST

Patent Literature

PTL 1: Japanese Unexamined Patent Application Publication No. 2013-242466

SUMMARY OF THE INVENTION

To be suitable for entering light of a large aperture of a projector optical system or the like, a typical MacNeille PBS is increased in thickness. Therefore, an optical path becomes long. In particular, transmittance decreases due to absorption of a blue wavelength band, and heat generation occurs.

It is desirable to provide a polarizing beam splitter and a projector that each have a short optical path and a characteristic of less heat generation.

A polarizing beam splitter according to one embodiment of the present disclosure includes a transparent optical member, at least one first polarizing beam splitting film, and at least one second polarizing beam splitting film. The at least one first polarizing beam splitting film is disposed inside the transparent optical member to be tilted at a first tilt angle with respect to a first axis. The first axis is parallel to entering light. The at least one second polarizing beam splitting film is disposed inside the transparent optical member to be tilted at a second tilt angle with respect to the first axis. The second tilt angle is in a direction opposite to that of the first tilt angle.

A projector according to one embodiment of the present disclosure includes two or more polarizing beam splitters and at least one light modulator. The two or more polarizing beam splitters receive illumination light. The at least one light modulator modulates the illumination light received via the two or more polarizing beam splitters to generate a projection image. The at least one particular polarizing beam splitter of the two or more polarizing beam splitters includes a transparent optical member, at least one first polarizing beam splitting film, and at least one second polarizing beam splitting film. The at least one first polarizing beam splitting film is disposed inside the transparent optical member to be tilted at a first tilt angle with respect to a first axis. The first axis is parallel to entering light. The at least one second polarizing beam splitting film is disposed inside the transparent optical member to be tilted at a second tilt angle with respect to the first axis. The second tilt angle is in a direction opposite to that of the first tilt angle.

In the polarizing beam splitter or the projector according to the embodiment of the present disclosure, the at least one first polarizing beam splitting film that is disposed to be tilted at the first tilt angle and the at least one second polarizing beam splitting film that is disposed to be tilted at the second tilt angle, with respect to the first axis, that is in the direction opposite to that of the first tilt angle perform polarizing beam splitting of entering light.

MODES FOR CARRYING OUT THE INVENTION

Hereinafter, some embodiments of the present disclosure are described in detail with reference to the drawings. Note that the description will be given in the following order.

1. First Embodiment (Description of Polarizing Beam Splitter) (FIGS. 1 to 6)
   1.1 Basic Configuration Example of Polarizing Beam Splitter According to First Embodiment
   1.2 Modifications of First Embodiment
   1.3 Effects 2. Second Embodiment (Description of Projector) (FIGS. 7 to 10)
   2.1 First Configuration Example of Projector According to Second Embodiment
   2.2 Second Configuration Example of Projector According to Second Embodiment
3. Other Embodiments

1. First Embodiment

Figure 1:
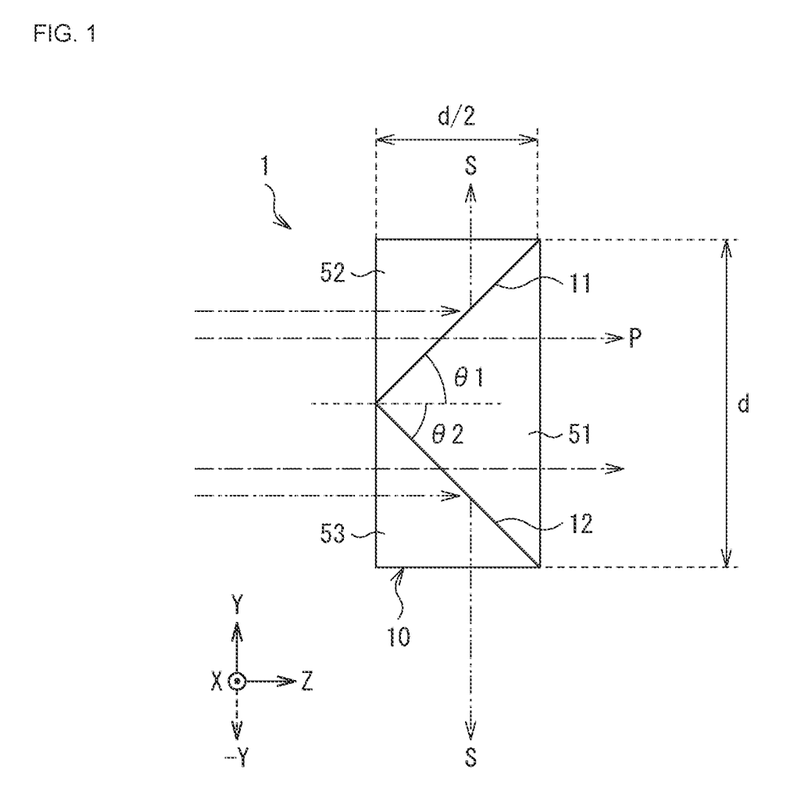
FIG. 1 is a schematic cross-sectional view of a basic configuration example of a polarizing beam splitter according to a first embodiment of the present disclosure.

1.1 Basic Configuration Example of Polarizing Beam Splitter According to First Embodiment FIG. 1 schematically illustrates a basic configuration example of a polarizing beam splitter 1 according to a first embodiment of the present disclosure.

The polarizing beam splitter 1 according to the first embodiment includes a transparent optical member 10, a first polarizing beam splitting film 11 and a second polarizing beam splitting film 12. The first polarizing beam splitting film 11 and the second polarizing beam splitting film 12 are provided inside the transparent optical member 10.

The first polarizing beam splitting film 11 is disposed inside the transparent optical member 10 to be tilted at a first tilt angle θ1 with respect to a first axis parallel to entering light. The second polarizing beam splitting film 12 is disposed inside the transparent optical member 10 to be tilted at a second tilt angle θ2 with respect to the first axis. The second tilt angle θ2 is in a direction opposite to that of the first tilt angle θ1. The first tilt angle θ1 is, for example, approximately 45°. The second tilt angle θ2 is, for example, approximately −45°.

Here, a Z-axis in FIG. 1 corresponds to the first axis parallel to the entering light. Note that the two axes that are orthogonal to the Z-axis and are orthogonal to each other are set as an X-axis and a Y-axis. FIG. 1 illustrates a cross-sectional configuration example on a plane parallel to a ZY plane. This is similarly applicable to the following modifications and other embodiments.

The transparent optical member 10 includes, for example, a glass material or a resin material. Each of the first polarizing beam splitting film 11 and the second polarizing beam splitting film 12 includes, for example, a dielectric multilayer film. The transparent optical member 10 has, for example, a configuration in which first to third right-angle prisms 51 to 53 are joined to each other. For example, the transparent optical member 10 has a configuration in which a titled surface of the second right-angle prism 52 and a titled surface of the third right-angle prism 53 are joined to respective two side surfaces of the first right-angle prism 51 disposed in the middle. Thus, for example, the first polarizing beam splitting film 11 and the second polarizing beam splitting film 12 are disposed to be so tilted that the first polarizing beam splitting film 11 and the second polarizing beam splitting film 12 are approximately orthogonal to each other.

The first polarizing beam splitting film 11 is formed as a film, for example, on a first side surface of the first right-angle prism 51 by vapor deposition or the like. Alternatively, the first polarizing beam splitting film 11 may be formed on the tilted surface of the second right-angle prism 52. The second polarizing beam splitting film 12 is formed as a film, for example, on a second side surface of the first right-angle prism 51 by vapor deposition or the like. Alternatively, the second polarizing beam splitting film 12 may be formed on a tilted surface of the third right-angle prism 53.

The polarizing beam splitter 1 acts as a MacNeille PBS. The first polarizing beam splitting film 11 has a characteristic of transmitting a first polarization component (a P-polarization component) included in the entering light in a first direction parallel to the entering light, and reflecting a second polarization component (an S-polarization component) included in the entering light in a second direction orthogonal to the first direction.

The second polarizing beam splitting film 12 has a characteristic of transmitting the first polarization component in the first direction, and reflecting the second polarization component in a third direction that is orthogonal to the first direction and different from the second direction by 180°.

Here, the Z-direction in FIG. 1 corresponds to the first direction. Further, the Y-direction corresponds to the second direction. A direction opposite to the Y-direction (−Y-direction) corresponds to the third direction. This is similarly applicable to the following modifications and other embodiments.

Figure 2:
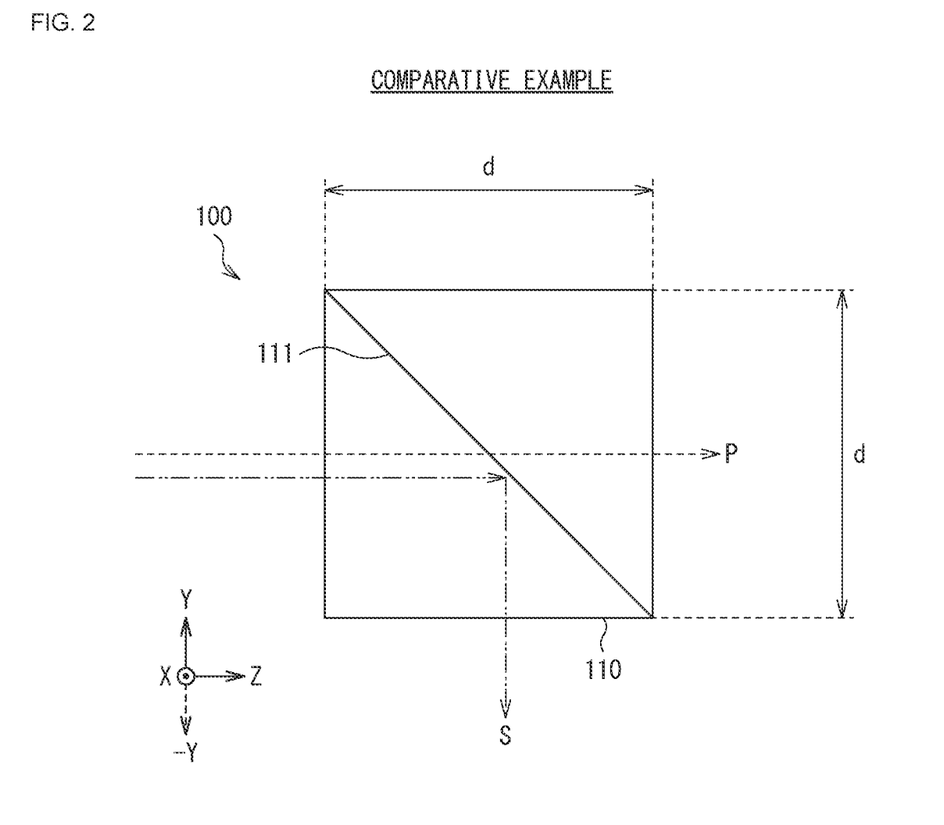
FIG. 2 is a schematic cross-sectional view of a configuration example of a polarizing beam splitter (a typical MacNeille PBS) according to a comparative example.

FIG. 2 schematically illustrates a configuration example of a polarizing beam splitter 100 according to a comparative example.

The polarizing beam splitter 100 according to the comparative example illustrated in FIG. 2 is a typical MacNeille PBS. In the polarizing beam splitter 100, a polarizing beam splitting film 111 is disposed inside a transparent optical member 110.

The polarizing beam splitting film 111 is disposed to be tilted at a tilt angle of 45° with respect to an axis of entering light. The transparent optical member 10 has, for example, a configuration in which two right-angle prisms are joined to each other, and has a cubic shape as a whole.

In the polarizing beam splitter 100 according to the comparative example, a size (an effective size) of the transparent optical member 10 in a direction along the first axis (the Z-axis) and a size (a thickness) of the transparent optical member 10 in a direction along the second axis (the Y-axis) orthogonal to the first axis are both d, and have a relationship of 1:1.

In contrast, in the polarizing beam splitter 1 according to the first embodiment, the size (the effective size) of the transparent optical member 10 in the direction along the first axis (the Z-axis) is smaller than the size (the thickness) of the transparent optical member 10 in the direction along the second axis (the Y-axis) orthogonal to the first axis. Specifically, while the effective size with respect to the entering light is d, the thickness is d/2. That is, the thickness of the polarizing beam splitter 1 according to the first embodiment is ½ of the thickness of the typical MacNielle PBS. Accordingly, the polarizing beam splitter 1 is reduced in thickness.

1.2 Modifications of First Embodiment (First Modification)

Figure 3:
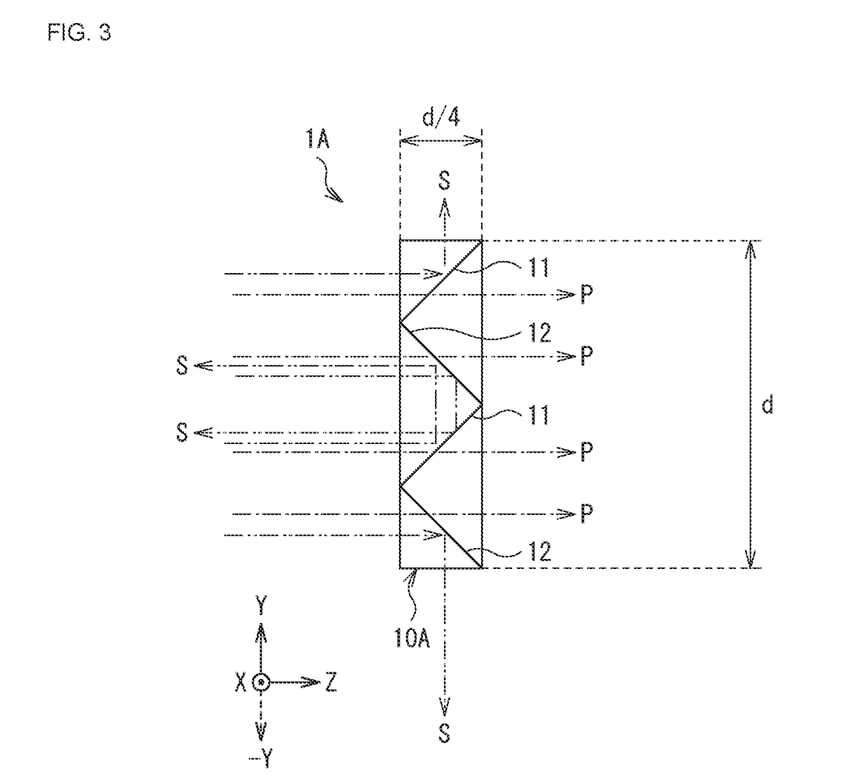
FIG. 3 is a schematic cross-sectional view of a configuration example of a polarizing beam splitter according to a first modification of the first embodiment.

FIG. 3 schematically illustrates a configuration example of a polarizing beam splitter 1A according to a first modification of the first embodiment.

The polarizing beam splitter 1A according to the first modification includes two first polarizing beam splitting films 11 and two second polarizing beam splitting films 12 inside a transparent optical member 10A. In the transparent optical member 10A, the first polarizing beam splitting films 11 and the second polarizing beam splitting films 12 are alternately disposed along the second axis (the Y-axis) orthogonal to the first axis (the Z-axis).

As with the polarizing beam splitter 1 according to the first embodiment, the polarizing beam splitter 1A according to the first modification serves as a MacNeille PBS to transmit the first polarization component (the P-polarization component) of the entering light and to reflect the second polarization component (the S-polarization component).

The polarizing beam splitter 1A according to the first modification, while the effective size with respect to the entering light is d, the thickness is d/4. That is, the thickness of the polarizing beam splitter 1A according to the first modification is ¼ of the thickness of a typical MacNeille PBS, and is ½ of the thickness of the polarizing beam splitter 1 according to the first embodiment. Accordingly, the polarizing beam splitter 1A according to the first modification is further reduced in thickness.

The polarizing beam splitter 1A according to the first modification can be manufactured, for example, by disposing two devices each having a thickness of ½ of the thickness of the polarizing beam splitter 1 according to the first embodiment in series in the Y-axis direction, and joining the two devices to each other.

Other configurations and workings may be substantially similar to those of the polarizing beam splitter 1 according to the first embodiment described above.

(Second Modification)

Figure 4:
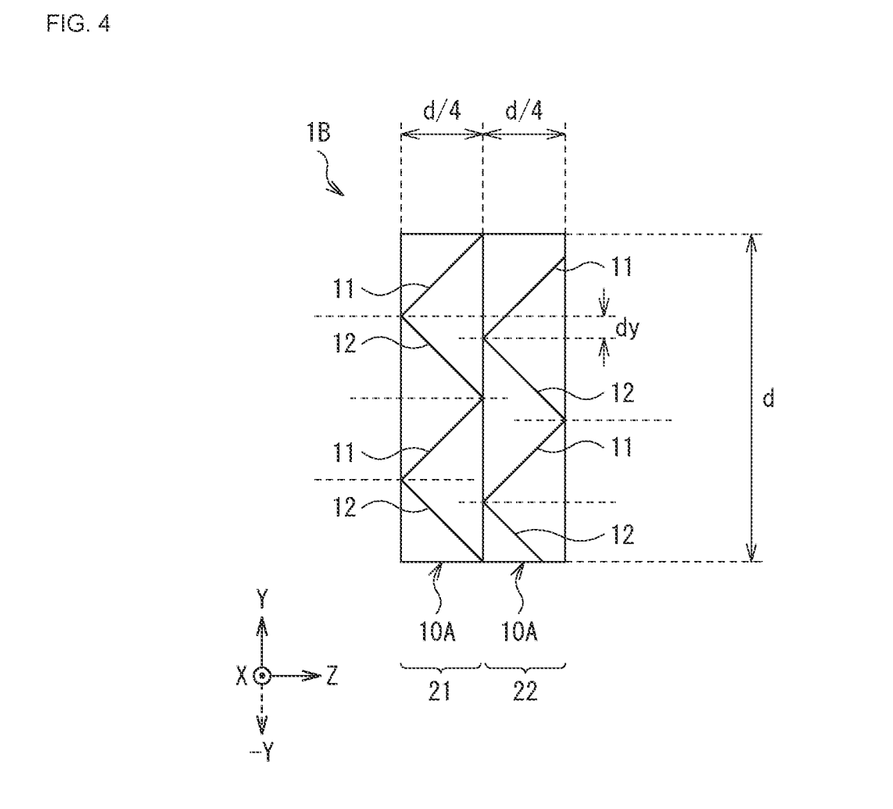
FIG. 4 is a schematic cross-sectional view of a configuration example of a polarizing beam splitter according to a second modification of the first embodiment.
Figure 5:
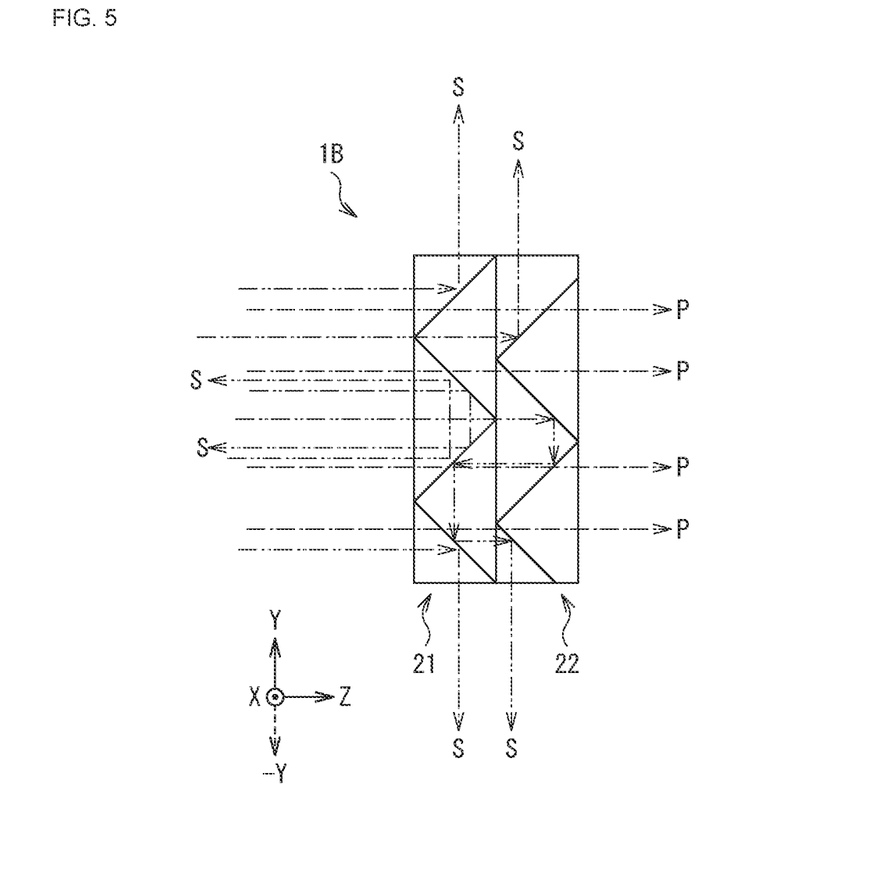
FIG. 5 is a schematic cross-sectional view of a light splitting action by the polarizing beam splitter according to the second modification of the first embodiment.

FIG. 4 schematically illustrates a configuration example of a polarizing beam splitter 1B according to a second modification of the first embodiment. FIG. 5 schematically illustrates a light separation action of the polarizing beam splitter 1B according to the second modification.

The polarizing beam splitter 1B according to the second modification includes a first block 21 and a second block 22 disposed side by side along the first axis (the Z-axis).

The first block 21 and the second block 22 each include the transparent optical member 10A as well as the first polarizing beam splitting film 11 and the second polarizing beam splitting film 12 disposed inside the transparent optical member 10A. Each of the first block 21 and the second block 22 has a configuration substantially similar to that of the polarizing beam splitter 1A according to the first modification. Each of the first block 21 and the second block 22 has, for example, a configuration in which the polarizing beam splitters 1A according to the first modification are disposed side by side and are joined to each other.

However, it is preferable that the first block 21 and the second block 22 are not completely identical in the configuration of the side-by-side arrangement of the polarizing beam splitters, and the disposed positions of the first polarizing beam splitting film 11 and the second polarizing beam splitting film 12 are shifted between the first block 21 and the second block 22 in the Y-axis direction by dy (FIG. 4). That is, it is preferable that the disposed positions of the first polarizing beam splitting film 11 and the second polarizing beam splitting film 12 in the first block 21 and the disposed positions of the first polarizing beam splitting film 11 and the second polarizing beam splitting film 12 in the second block 22 are shifted from each other by dy (FIG. 4), when viewed from an entering direction of the entering light.

Thus, by shifting the disposed positions of the first and the second polarizing beam splitting films 11 and 12 between the first block 21 and the second block 22, the following effects are obtainable. For example, as illustrated in FIG. 5, at a border part of the first polarizing beam splitting film 11 and the second polarizing beam splitting film in the first block 21, the second polarization component (the S-polarization component) which is to be reflected is not reflected but is transmitted. The second polarization component (the S-polarization component) transmitted through the first block 21 enters the first polarizing beam splitting film 11 or the second polarizing beam splitting film 12 of the second block 22. This is because the disposed positions of the first and the second polarizing beam splitting films 11 and 12 of the second block 22 are shifted from those of the first block 21. As a result, the second polarization component (the S-polarization component) transmitted through the first block 21 is reflected by the second block 22. Accordingly, it is possible to reduce leakage of light at the border part of the first polarization separation film 11 and the second polarizing beam splitting film 12.

(Third Modification)

Figure 6:
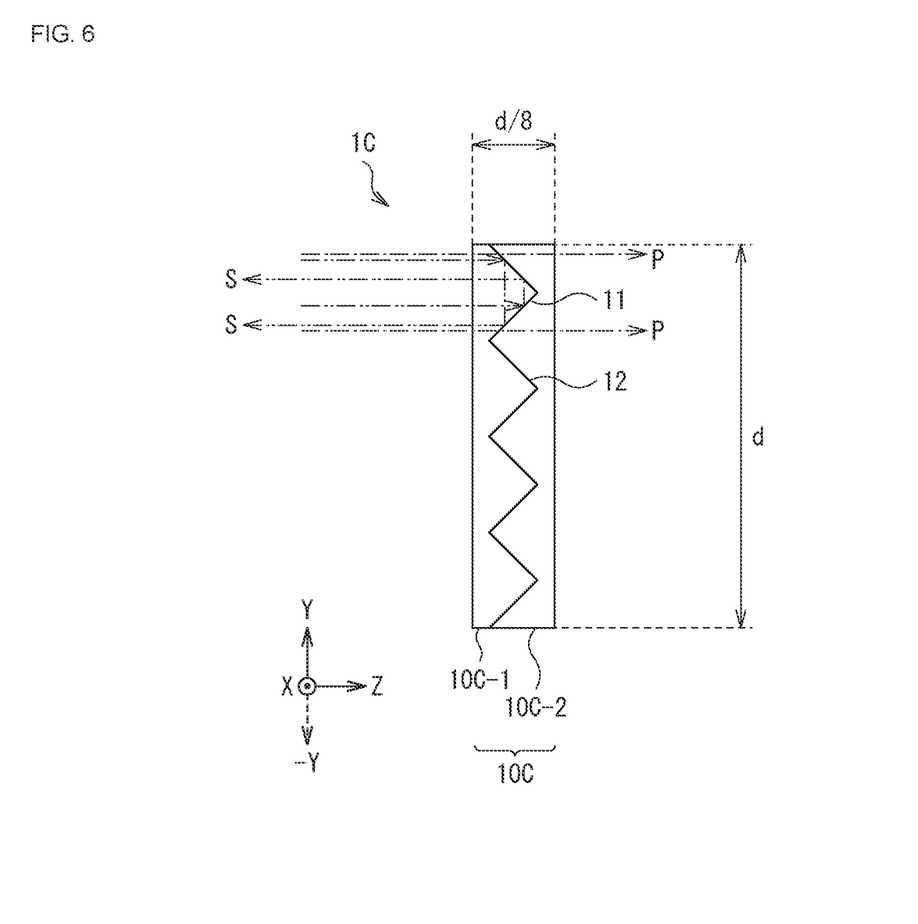
FIG. 6 is a schematic cross-sectional view of a light splitting action by the polarizing beam splitter according to a third modification of the first embodiment.

FIG. 6 schematically illustrates a configuration example of a polarizing beam splitter 1B according to a third modification of the first embodiment.

In the polarizing beam splitter 1A according to the first modification described above, the configuration example including the two first polarizing beam splitting films 11 and the two second polarizing beam splitting films 12 has been described. However, a configuration including three or more first polarizing beam splitting films 11 and three or more second polarizing beam splitting films 12 may be employed.

The polarizing beam splitter 1C according to the third modification illustrated in FIG. 6 includes four first polarizing beam splitting films 11 and four second polarizing beam splitting films 12 inside a transparent optical member 10C. In the transparent optical member 10C, the first polarizing beam splitting films 11 and the second polarizing beam splitting films 12 are alternately disposed along the second axis (the Y-axis) orthogonal to the first axis (the Z-axis).

As with the polarizing beam splitter 1 according to the first embodiment, the polarizing beam splitter 1C according to the third modification serves as a MacNeille PBS to transmit the first polarization component (the P-polarization component) of the entering light and to reflect the second polarization component (the S-polarization component).

The polarizing beam splitter 1C according to the third modification has the effective size with respect to the entering light of d and a thickness of approximately d/8. That is, the thickness of the polarizing beam splitter 1C according to the third modification is approximately ⅛ of the thickness of a typical MacNeille PBS, and is approximately ¼ of the thickness of the polarizing beam splitter 1 according to the first embodiment. Accordingly, the polarizing beam splitter 1C according to the third modification is further reduced in thickness.

In the polarizing beam splitter 1C according to the third modification, the transparent optical member 10C includes, for example, two members (a first optical member 10C-1 and a second optical member 10C-2) having respective tilted parts corresponding to the first polarizing beam splitting film 11 and the second polarizing beam splitting film 12. The polarizing beam splitter 1C according to the third modification can be manufactured as follows. For example, the first polarizing beam splitting film 11 and the second polarizing beam splitting film 12 are formed on a tilted part of one of the first optical member 10C-1 and the second optical member 10C-2 by vapor deposition or the like. Thereafter, the first optical member 10C-1 and the second optical member 10C-2 are so joined to each other that the tilted parts thereof are opposed to each other.

Other configurations and workings may be substantially similar to those of the polarizing beam splitter 1 according to the first embodiment or the polarizing beam splitter 1A according to the first modification described above.

1.3 Effects

As described above, according to the polarizing beam splitter according to any of the first embodiment and the modifications thereof, the first polarizing beam splitting film 11 and the second polarizing beam splitting film 12 which serve as a MacNeille PBS are disposed to be tilted approximately orthogonal to each other. Therefore, a shorter optical path and a characteristic of less heat generation are achievable, as compared with the configuration of the typical MacNeille PBS (FIG. 2).

Further, according to the polarizing beam splitter of any of the first embodiment and the modifications thereof, the thickness is allowed to be reduced as compared with the configuration of the typical MacNeille PBS (FIG. 2). Further, in a case where a dielectric multi-layer film is used for the first polarizing beam splitting film 11 and the second polarizing beam splitting film 12, it is possible to perform polarizing beam splitting with a less light amount loss and high efficiency.

It is to be noted that the effects described in the present specification are merely illustrative and not limitative, and any other effect may be provided. This is similarly applicable to effects of the following other embodiments.

2. Second Embodiment

Next, a projector according to a second embodiment of the present disclosure is described. Note that, in the following description, substantially the same components as those of the polarizing beam splitter according to the first embodiment described above are denoted by the same reference numerals, and descriptions thereof will be omitted as appropriate.

2.1 First Configuration Example of Projector According to Second Embodiment

Figure 7:
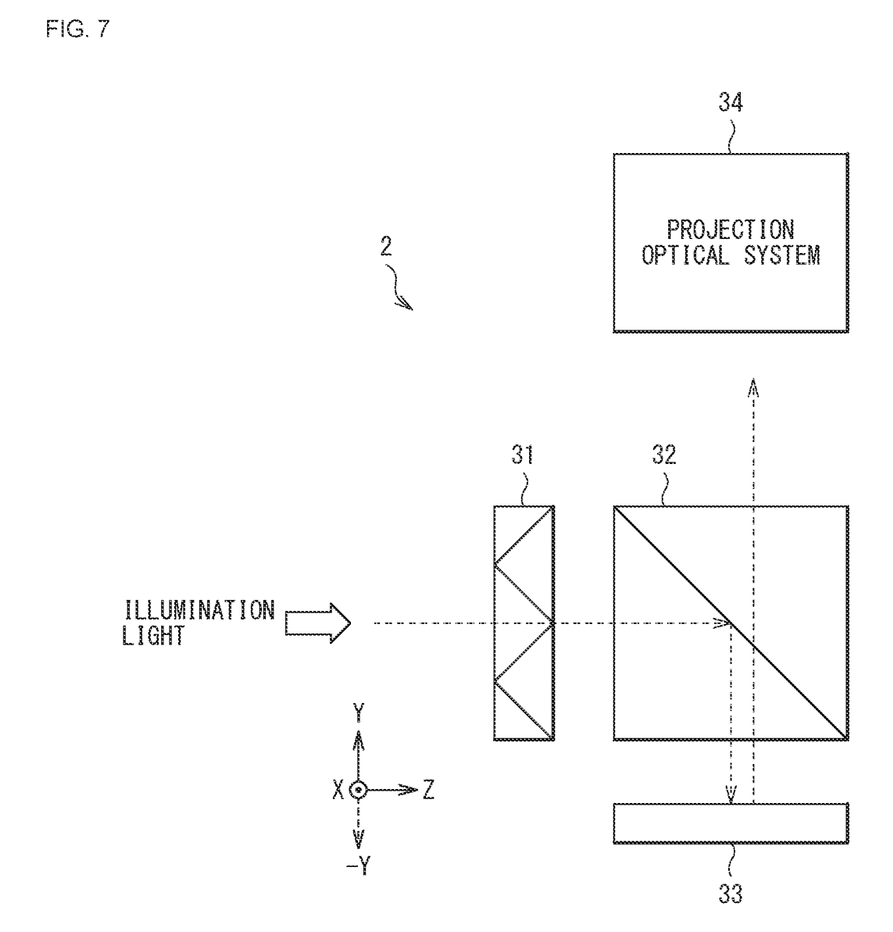
FIG. 7 is a configuration diagram schematically illustrating a first configuration example of a projector according to a second embodiment.

FIG. 7 schematically illustrates a first configuration example of a projector 2 according to a second embodiment.

The projector 2 includes two or more polarizing beam splitters and a light modulator 33. The two or more polarizing beam splitters receive illumination light from an unillustrated illumination optical system. The light modulator 33 modulates the illumination light received via the two or more polarizing beam splitters to generate a projection image. Further, the projector 2 includes a projection optical system 34. The projection optical system 34 projects the projection image generated by the light modulator 33 onto an unillustrated projection surface such as a screen. The projection optical system 34 includes, for example, two or more lenses.

The projector 2 is of a so-called single-plate type using the single light modulator 33. Therefore, in a case of performing color display, the projector 2 performs full color display in a time divisional manner. When performing the color display, for example, the illumination lights of the respective colors of R, G, and B are time-divisionally applied to the light modulator 33. The light modulator 33 time-divisionally generates the projection images of the respective colors for the illumination lights of the respective colors in synchronization with timings of application of the illumination light of the respective colors. The light modulator 33 modulates the illumination light on the basis of an image signal to generate the projection image. The light modulator 33 includes, for example, a reflective display device such as an LCOS (Liquid Crystal On Silicon).

The projector 2 includes, as the two or more polarizing beam splitters, for example, a pre PBS 31 and a main PBS 32. The pre PBS 31 receives the illumination light. The main PBS 32 receives the illumination light transmitted through the pre PBS 31. At least one particular polarizing beam splitter of the two or more polarizing beam splitters is configured by the polarizing beam splitter of the present disclosure. FIG. 7 illustrates an example in which the pre PBS 31 is configured by the particular polarizing beam splitter. FIG. 7 illustrates an example in which the pre PBS 31 is configured by the polarizing beam splitter 1A (FIG. 3) according to the first modification of the first embodiment described above. However, the pre PBS 31 may be configured by the polarizing beam splitter 1 illustrated in FIG. 1, the polarizing beam splitter 1B illustrated in FIG. 4, or the polarizing beam splitter 1C illustrated in FIG. 6.

The main PBS 32 reflects the illumination light of a particular polarization component transmitted through the pre PBS 31 and outputs it toward the light modulator 33. From the light modulator 33, as the projection image, light of another polarization component orthogonal to the particular polarization component is outputted. The main PBS 32 transmits light of the projection image from the light modulator 33, and outputs it toward the projection optical system 34.

Figure 8:
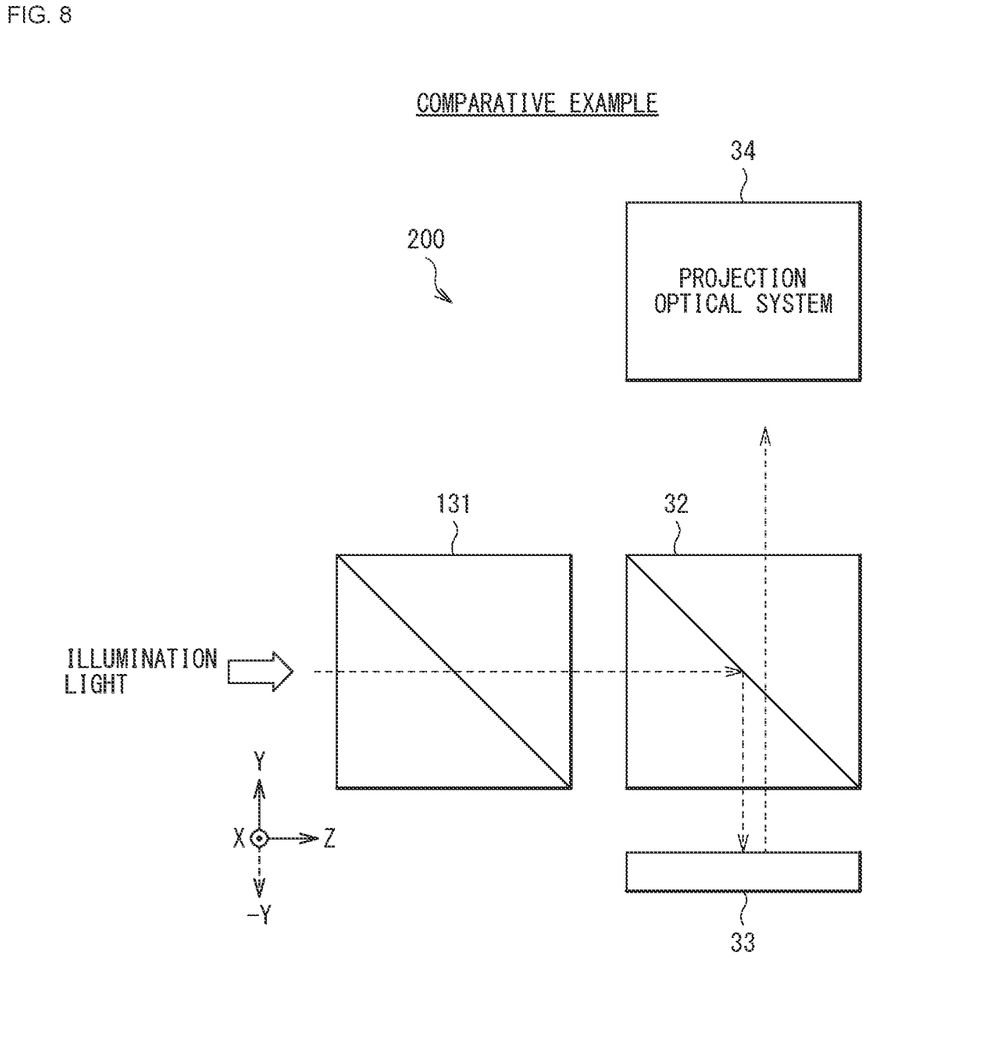
FIG. 8 is a configuration diagram schematically illustrating a configuration example of a projector according to a first comparative example.

FIG. 8 schematically illustrates a configuration example of a projector 200 according to a first comparative example.

The projector 200 according to the first comparative embodiment includes a pre PBS 131 configured by a typical MacNeille PBS instead of the pre PBS 31 in the projector 2 illustrated in FIG. 7.

In the projector 200 according to the first comparative example, the pre PBS 131 is configured by a typical MacNeille PBS. Thus, the configuration increases in size. In contrast, in the projector 2 according to the second embodiment, the pre PBS 31 is configured by the polarizing beam splitter of the present disclosure. Thus, the configuration can be reduced in size. Further, in the projector 2 according to the second embodiment, as compared with the projector 200 according to the first comparative embodiment, the pre PBS 31 has a characteristic of less heat generation. Therefore, it is possible to reduce deterioration of image quality and also to reduce deterioration of a component of the projector 2. Accordingly, product reliability is improved.

Figure 9:
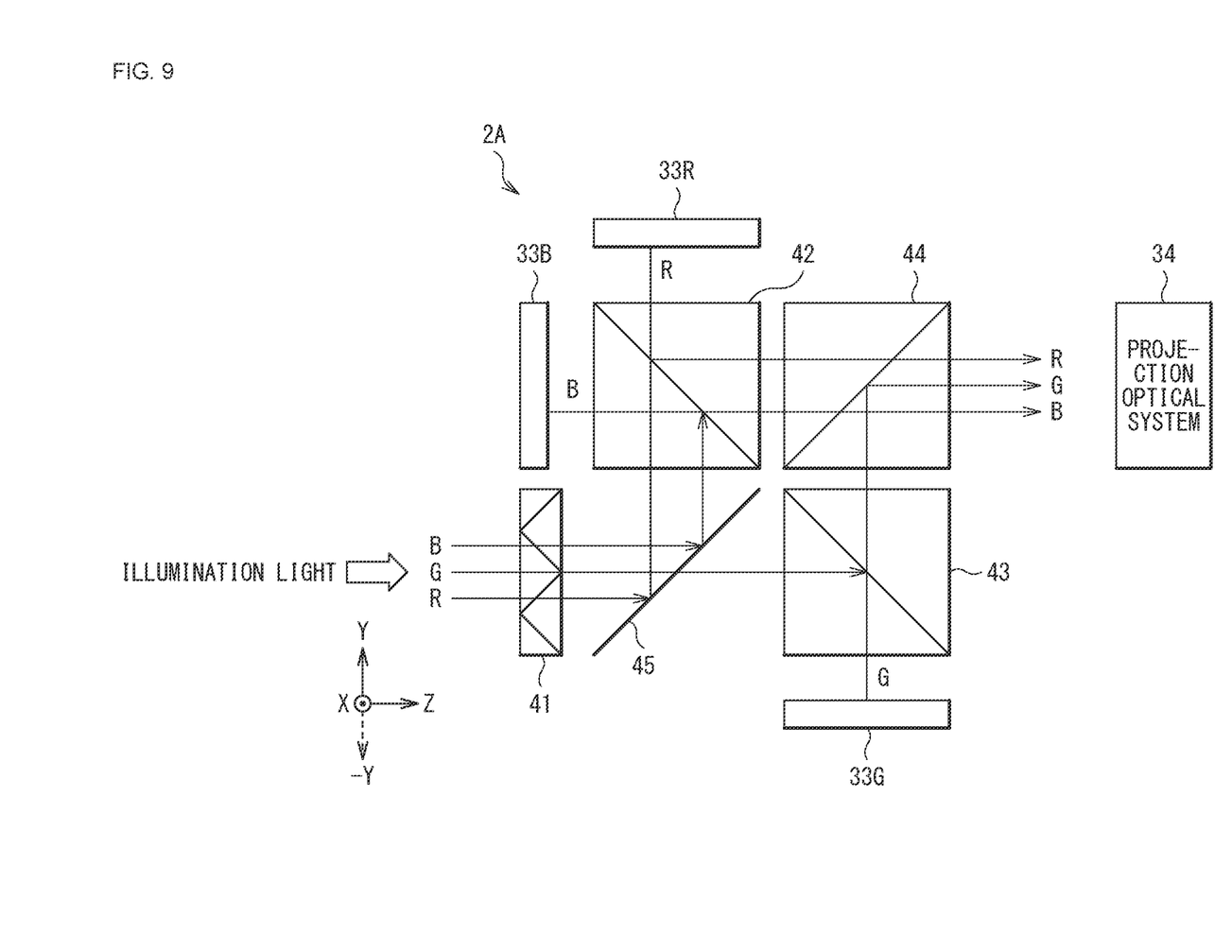
FIG. 9 is a configuration diagram schematically illustrating a second configuration example of the projector according to the second embodiment.

2.2 Second Configuration Example of Projector According to Second Embodiment FIG. 9 schematically illustrates a second configuration example of a projector 2A according to a second embodiment.

The projector 2A includes two or more polarizing beam splitters and two or more light modulators. The two or more polarizing beam splitters receive illumination light from an unillustrated illumination optical system. The two or more light modulators modulate the illumination light received via the two or more polarizing beam splitters to generate the projection image. Further, the projector 2A includes a post PBS 44 and a dichroic mirror 45. Further, the projector 2A includes the projection optical system 34. The projection optical system 34 projects the projection image generated by the two or more light modulators onto an unillustrated projection surface such as a screen. The projection optical system 34 includes, for example, two or more lenses.

The projector 2A includes, as the two or more light modulators, for example, three light modulators (a red light modulator 33R, a green light modulator 33G, and a blue light modulator 33B).

The red light modulator 33R receives red illumination light. The red light modulator 33R modulates the red illumination light to generate a red projection image. The green light modulator 33G receives green illumination light. The green light modulator 33G modulates the green illumination light to generate a green projection image. The blue light modulator 33B receives blue illumination light. The blue light modulator 33B modulates the blue illumination light to generate a blue projection image. Each of the three light modulators is configured by, for example, a reflective display device such as an LCOS.

The projector 2A includes, as the two or more polarizing beam splitters, a pre PBS 41, a main PBS 42, and a main PBS 43. Of the two or more polarizing beam splitters, at least one particular polarizing beam splitter is configured by the polarizing beam splitter of the present disclosure. FIG. 9 illustrates an example in which the pre PBS 41 is configured by the particular polarizing beam splitter. FIG. 9 illustrates an example in which the pre PBS 41 is configured by the polarizing beam splitter 1A (FIG. 3) according to the first modification of the first embodiment described above. However, the pre PBS 41 may be configured by the polarizing beam splitter 1 illustrated in FIG. 1, the polarizing beam splitter 1B illustrated in FIG. 4, or the polarizing beam splitter 1C illustrated in FIG. 6.

The pre PBS 41 receives, for example, the illumination light including colors of R, G, and B. The main PBS 42 receives the illumination light of red and blue transmitted through the pre PBS 41 and reflected by the dichroic mirror 45.

The main PBS 42 transmits red illumination light of the illumination light of red and blue, and outputs it toward the red light modulator 33R. The red light modulator 33R outputs a red projection image. The main PBS 42 reflects light of the red projection image from the red light modulator 33R, and outputs it toward the post PBS 44.

Further, the main PBS 42 reflects blue illumination light of the illumination light of red and blue, and outputs it toward the blue light modulator 33B. The blue light modulator 33B outputs a blue projection image. The main PBS 42 transmits light of the blue projection image from the blue light modulator 33B, and outputs it toward the post PBS 44.

The main PBS 43 receives green illumination light transmitted through the pre PBS 41 and the dichroic mirror 45. The main PBS 43 reflects the green illumination light, and outputs it toward the green light modulator 33G. The green light modulator 33G outputs a green projection image. The main PBS 43 transmits light of the green projection image from the green light modulator 33G, and outputs it toward the post PBS 44.

The post PBS 44 combines the projection images of the respective colors of R, G, and B, and outputs it toward the projection optical system 34.

Figure 10:
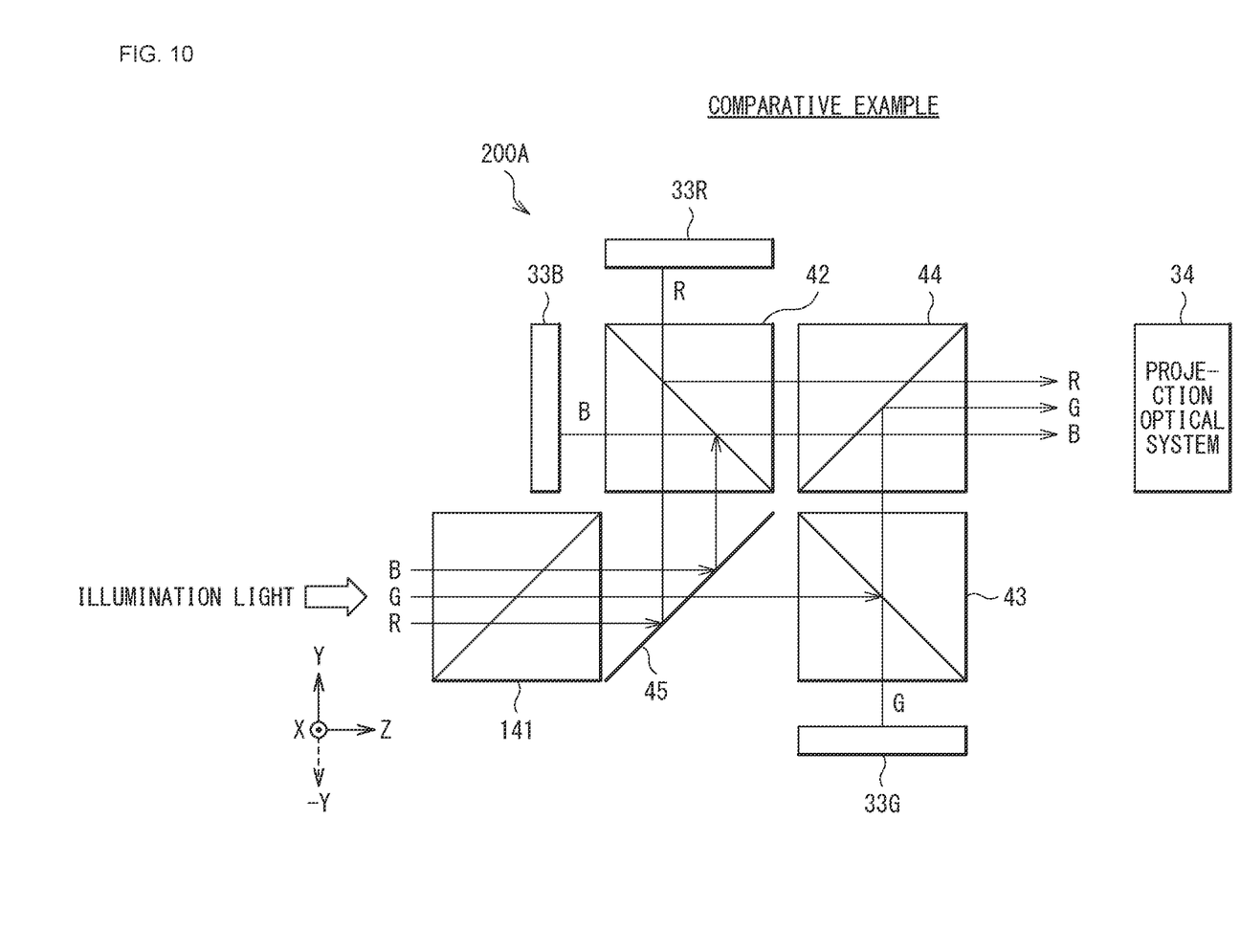
FIG. 10 is a configuration diagram schematically illustrating a configuration example of a projector according to a second comparative example.

FIG. 10 schematically illustrates a configuration example of a projector 200A according to a second comparative example.

The projector 200A according to the second comparative example includes a pre PBS 141 configured by a typical MacNeille PBS instead of the pre PBS 41 in the projector 2A illustrated in FIG. 9.

In the projector 200A according to the second comparative example, the pre PBS 141 is configured by a typical MacNeille PBS. Thus, the configuration increases in size. In contrast, in the projector 2A illustrated in FIG. 9, the pre PBS 41 is configured by the polarizing beam splitter of the present disclosure. Thus, the configuration can be reduced in size. Further, in the projector 2A illustrated in FIG. 9, as compared with the projector 200A according to the second comparative example, the pre PBS 41 has a characteristic of less heat generation. Therefore, it is possible to reduce deterioration of image quality, and also to reduce deterioration of a component of the projector 2A. Accordingly, product reliability is improved.

3. Other Embodiments

The technology according to the present disclosure is not limited to the description of each of the embodiments above, and is modifiable in a variety of ways.

For example, in the second embodiment described above, a description is given of a case where the polarizing beam splitter of the present disclosure is applied to a projector. However, the polarizing beam splitter of the present disclosure is also applicable to an apparatus other than the projector.

For example, the present technology can also have any of the following configurations.

According to the present technology having any of the following configurations, it is possible to achieve a short optical path and a characteristic of less heat generation.

(1)

A polarizing beam splitter including:

a transparent optical member;

at least one first polarizing beam splitting film that is disposed inside the transparent optical member to be tilted at a first tilt angle with respect to a first axis, the first axis being parallel to entering light; and at least one second polarizing beam splitting film that is disposed inside the transparent optical member to be tilted at a second tilt angle with respect to the first axis, the second tilt angle being in a direction opposite to that of the first tilt angle.

(2)

The polarizing beam splitter according to (1) described above, in which the first polarizing beam splitting film and the second polarizing beam splitting film are disposed to be tilted approximately orthogonal to each other.

(3)

The polarizing beam splitter according to (1) or (2) described above, in which the first polarizing beam splitting film has a characteristic of transmitting a first polarization component included in the entering light in a first direction, and reflecting a second polarization component included in the entering light in a second direction, the first direction being parallel to the entering light, the second direction being orthogonal to the first direction, and the second polarizing beam splitting film has a characteristic of transmitting the first polarization component in the first direction, and reflecting the second polarization component in a third direction, the third direction being orthogonal to the first direction and different from the second direction by 180 degrees.

(4)

The polarizing beam splitter according to any one of (1) to (3) described above, in which the first polarizing beam splitting film includes two or more first polarizing beam splitting films, and the second polarizing beam splitting film includes two or more second polarizing beam splitting films, and the first polarizing beam splitting films and the second polarizing beam splitting films are alternately disposed along a second axis, the second axis being orthogonal to the first axis.

(5)

The polarizing beam splitter according to any one of (1) to (4) described above, further including a first block and a second block that are disposed side by side along the first axis, in which the first block and the second block each have the transparent optical member, the first polarizing beam splitting film, and the second polarizing beam splitting film.

(6)

The polarizing beam splitter according to (5) described above, in which disposed positions of the first polarizing beam splitting film and the second polarizing beam splitting film in the first block and disposed positions of the first polarizing beam splitting film and the second polarizing beam splitting film in the second block are shifted from each other when viewed from an entering direction of the entering light.

(7)

The polarizing beam splitter according to any one of (1) to (6) described above, in which a size of the transparent optical member in a direction along the first axis is smaller than a size of the transparent optical member in a direction along a second axis orthogonal to the first axis.

(8)

A projector including:

two or more polarizing beam splitters that receive illumination light; and at least one light modulator that modulates the illumination light received via the two or more polarizing beam splitters to generate a projection image, at least one particular polarizing beam splitter of the two or more polarizing beam splitters including a transparent optical member, at least one first polarizing beam splitting film that is disposed inside the transparent optical member to be tilted at a first tilt angle with respect to a first axis, the first axis being parallel to entering light, and at least one second polarizing beam splitting film that is disposed inside the transparent optical member to be tilted at a second tilt angle with respect to the first axis, the second tilt angle being in a direction opposite to that of the first tilt angle.

(9)

The projector according to (8) described above, in which the two or more polarizing beam splitters include a pre polarizing beam splitter that receives the illumination light, and a main polarizing beam splitter that receives the illumination light transmitted through the pre polarizing beam splitter, and the pre polarizing beam splitter includes the particular polarizing beam splitter.

The present application claims priority based on Japanese Patent Application No. 2018-169932 filed with the Japan Patent Office on Sep. 11, 2018, the entire contents of which are incorporated herein by reference.

It should be understood that those skilled in the art would make various modifications, combinations, sub-combinations, and alterations depending on design requirements and other factors, and they are within the scope of the attached claims or the equivalents thereof.

The invention claimed is:

1. A polarizing beam splitter, comprising:
a first block; and
a second block, wherein
the first block is side by side to the second block along a first axis,
the first block is joined to the second block,
each of the first block and the second block comprises:
a transparent optical member,
at least one first polarizing beam splitting film, wherein
the first polarizing beam splitting film is inside the transparent optical member,
the first polarizing beam splitting film is tilted at a first tilt angle with respect to the first axis, and
the first axis is parallel to light that enters the polarizing beam splitter, and
at least one second polarizing beam splitting film, wherein
the second polarizing beam splitting film is inside the transparent optical member,
the second polarizing beam splitting film is tilted at a second tilt angle with respect to the first axis, and
the second tilt angle is in a direction opposite to the first tilt angle, and
disposed positions of the first polarizing beam splitting film and the second polarizing beam splitting film in the first block are shifted from disposed positions of the first polarizing beam splitting film and the second polarizing beam splitting film in the second block along a direction orthogonal to an entering direction of the light.

2. The polarizing beam splitter according to claim 1, wherein the first polarizing beam splitting film is approximately orthogonal to the second polarizing beam splitting film.

3. The polarizing beam splitter according to claim 1, wherein
the first polarizing beam splitting film is configured to:
transmit a first polarization component corresponding to the light, wherein the first polarization component is transmitted in a first direction; and
reflect a second polarization component corresponding to the light, wherein
the second polarization component is reflected in a second direction,
the first direction is parallel to the light, and
the second direction is orthogonal to the first direction, and
the second polarizing beam splitting film is configured to:
transmit the first polarization component in the first direction, and
reflect the second polarization component in a third direction, wherein
the third direction is orthogonal to the first direction, and
the third direction is different from the second direction by 180 degrees.

4. The polarizing beam splitter according to claim 1, wherein
the first polarizing beam splitting film comprises two or more first polarizing beam splitting films,
the second polarizing beam splitting film comprises two or more second polarizing beam splitting films,
the first polarizing beam splitting films and the second polarizing beam splitting films are alternate along a second axis, and
the second axis is orthogonal to the first axis.

5. The polarizing beam splitter according to claim 1, wherein
- a size of the transparent optical member in a direction along the first axis is smaller than a size of the transparent optical member in a direction along a second axis, and
- the second axis is orthogonal to the first axis.

6. A projector, comprising:
- two or more polarizing beam splitters configured to receive illumination light;
- at least one light modulator configured to:
  - modulate the received illumination light; and
  - generate a projection image; and
- at least one particular polarizing beam splitter of the two or more polarizing beam splitters, wherein
  - the at least one particular polarizing beam splitter includes:
    - a first block, and
    - a second block, wherein
      - the first block is side by side to the second block along a first axis,
      - the first block is joined to the second block,
      - each of the first block and the second block comprises:
        - a transparent optical member,
        - at least one first polarizing beam splitting film, wherein
          - the first polarizing beam splitting film is inside the transparent optical member,
          - the first polarizing beam splitting film is tilted at a first tilt angle with respect to the first axis, and
          - the first axis is parallel to the illumination light that enters the at least one particular polarizing beam splitter, and
        - at least one second polarizing beam splitting film, wherein
          - the second polarizing beam splitting film is inside the transparent optical member,
          - the second polarizing beam splitting film is tilted at a second tilt angle with respect to the first axis, and
          - the second tilt angle is in a direction opposite to the first tilt angle, and
      - disposed positions of the first polarizing beam splitting film and the second polarizing beam splitting film in the first block are shifted from disposed positions of the first polarizing beam splitting film and the second polarizing beam splitting film in the second block along a direction orthogonal to an entering direction of the illumination light.

7. The projector according to claim 6, wherein
the two or more polarizing beam splitters include:
- a pre polarizing beam splitter configured to receive the illumination light, and
- a main polarizing beam splitter configured to receive the illumination light transmitted through the pre polarizing beam splitter, and the pre polarizing beam splitter includes the particular polarizing beam splitter.

* * * * *